Figure 1:
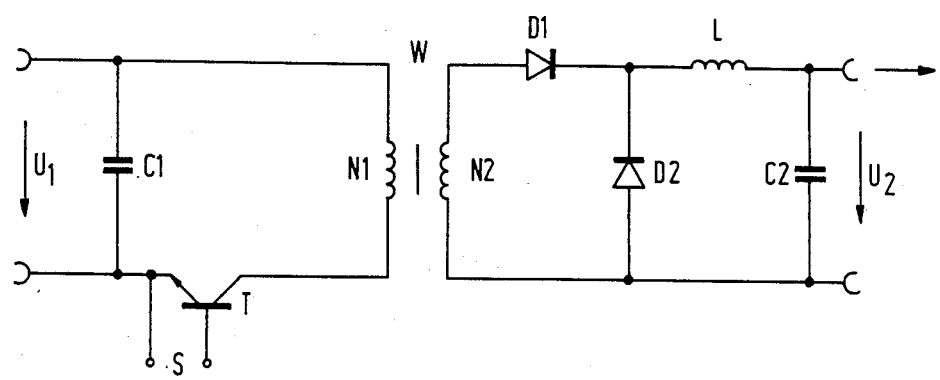

United States Patent [19]

Burghard

[11] Patent Number: 4,809,149
[45] Date of Patent: Feb. 28, 1989

[54] SINGLE-ENDED DOWN CONVERTER
[75] Inventor: Krahl Burghard, Leinburg, Fed. Rep. of Germany
[73] Assignee: U.S. Philips Corp., New York, N.Y.
[21] Appl. No.: 58,292
[22] Filed: Jun. 5, 1987
[30] Foreign Application Priority Data
  Sep. 6, 1986 [DE] Fed. Rep. of Germany ....... 3619352
[51] Int. Cl.$^4$ ........................................... H02M 3/335
[52] U.S. Cl. ........................................ 363/20; 363/41; 363/131
[58] Field of Search ............................ 363/20, 41, 131
[56] References Cited
  U.S. PATENT DOCUMENTS
  4,401,902  8/1933  Onodera et al. ................... 363/20
  4,680,688  7/1987  Inou et al. ....................... 363/131
  4,688,160  8/1987  Fraidlin ........................... 363/131

FOREIGN PATENT DOCUMENTS
  2624800  12/1977  Fed. Rep. of Germany .

Primary Examiner—Patrick R. Salce
Assistant Examiner—Anita M. Ault
Attorney, Agent, or Firm—Bernard Franzblau

[57] ABSTRACT

A controlled single-ended down converter comprises a transformer of d.c. separation of the input circuit and the output circuit, a switching element controlled in pulse width in the input circuit and a rectifier diode as well as a fly-wheel diode in the output circuit. During the conducting phase of the switching element, the transformer takes up magnetization energy. This energy is demagnetized through the barrier layer capacitance of the rectifier diode during the cut-off phase.

4 Claims, 2 Drawing Sheets

SINGLE-ENDED DOWN CONVERTER

BACKGROUND OF THE INVENTION

This invention relates to a single-ended down converter comprising a transformer, a pulse width controlled switching element in the input circuit and a rectifier diode as well as a fly-wheel diode in the output circuit.

The rectifier diode has a conductive state and a cut-off state caused by switching of the switching element.

In a down converter, energy is transmitted to the load circuit at the output end during the conducting phase of the switching element controlled in pulse width. The magnetization energy taken up by the transformer during the conducting phase of the switching element is still stored in the transformer each time the switching element opens the current circuit at the input end, which is the reason why the transformer must periodically be demagnetized. This can be effected by means of a so-called demagnetization winding additionally provided on the transformer.

It is already known from DE OS No. 2624800 to shunt, in an arrangement without such an additional demagnetization winding on the transformer, the switching element in the input circuit by a series-combination of a diode and a capacitor, a resistor being further connected parallel to the diode. When the switching element is opened, the series-combination of the diode and the capacitor takes over the decaying current of the primary winding. The capacitor is first charged approximately to the value of the input voltage when the influence of the parasitic inductance is neglected. The transformer voltage breaks down and increases again during the demagnetization with inverse polarity. The remagnetization of the transverse inductance of the transformer through the capacitor produces, during the cut-off time, a half period sinusoidal oscillation, which is added at the switching element to the input voltage as a cut-off voltage. The next time that the switching element is switched on, the charge on the capacitor is neutralized through the resistor and the switching element.

In down converters there is a tendency to use increasingly higher switching frequencies because consequently higher power can be transmitted with the same construction volume. Therefore, the circuit arrangements utilized must also be suitable for a high frequency range of, for example, 150 kHz. In this frequency range, the time constant of the switching means provided in the known circuit arrangement for the demagnetization switching element has a very disturbing effect because it no longer allows a sufficiently rapid demagnetization of the transformer.

SUMMARY OF THE INVENTION

An object of the invention is to provide a single-ended down converter of the kind mentioned in the opening paragraph, which is further simplified with respect to the known circuit arrangement and is also especially suitable for higher switching frequencies, for example in the range of 150 kHz and higher.

According to the invention this object is achieved in that the rectifier diode has a barrier layer capacitance present during the cut-off state of the rectifier diode whereby demagnetization of the transformer takes place only by means of said barrier layer capacitance during the cut-off state of this diode. Demagnetization switching means at the switching element at the input end are not required.

Figure 2:
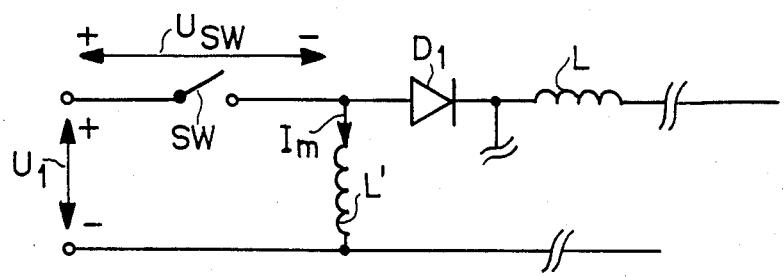
Figure 3:
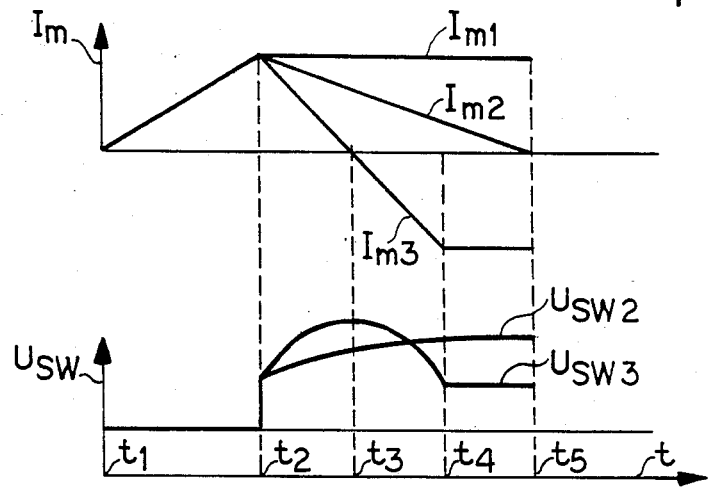
Figure 4:
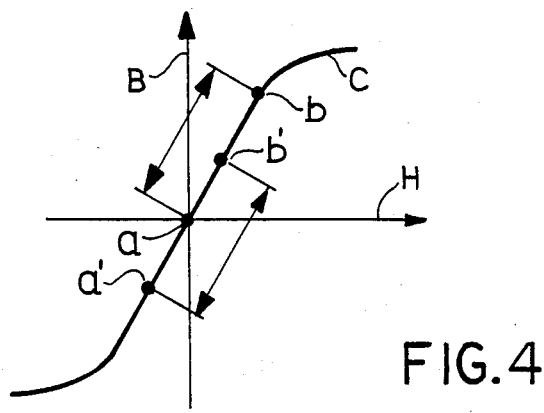

In order that the invention may be readily carried out, it will now be described more fully, by way of example, with reference to the accompanying drawing, in which FIG. 1 shows a single-ended down converter FIG. 2 shows an equivalent circuit of a part of the single-ended down converter, FIG. 3 shows time diagrams of a magnetization current $I_m$ and a switch voltage $U_{sw}$, and FIG. 4 shows a magnetization curve c.

The single ended down converter of FIG. 1 comprises a transformer W, which only comprises a winding N1 at the input end and a winding N2 at the output end. A switching element represented by the transistor T is connected in series with the winding N1 at the input end. A capacitor C1 is connected parallel to the input terminals, at which the input voltage U1 occurs. A rectifier diode D1 is connected in series with the secondary winding N2 of the transformer, while the flywheel diode D2 is connected parallel to the arrangement comprising the rectifier diode D1 and the secondary winding N2. Further, in the output circuit an inductance L is connected in series with the rectifier diode D1. The capacitor C2 is connected parallel to the output terminals, at which the output voltage U2 occurs. The transformer W transforms the voltage and current and separates the output from the input for direct current. During the conducting phase of the switching element constituted by the transistor T, a current flows from the input capacitor C1 to the load, not shown. The inductance L takes up energy corresponding to the flowing output current and to the difference between the transformed input voltage U1 and the output voltage U2. During the cut-off phase, which must be at least sufficient for the demagnetization of the transformer W, the current in the output circuit flows from the inductance L further through the flywheel diode D2 and to the load. The transistor T is driven between its base and its emitter at the terminals S by means of a timing circuit, not shown. The transistor T is advantageously constructed as a power MOS transistor. The output voltage U2 can be controlled in that the relative switching-on period is varied with a constant period duration given by the timing circuit.

The transformer W is advantageously proportioned for a small magnetization current. this can be achieved by the use of annular cores of high permeability or high AL value. These cores may also be made of materials which may be used as power transporters with clocked current supply sources. Further, the transformer W is proportioned for a small parasitic inductance.

The demagnetization of the transformer W during the cut-off time takes place only through the barrier layer capacitance of the rectifier diode D1. These barrier layer capacitances lie between 50 and 100 pF with conventional rectifier diodes. It has been found that the barrier layer capacitance exhibits very little variation in the individual specimens of a given type.

FIG. 2 shows an equivalent circuit of a part of the single ended down converter shown in FIG. 1. The equivalent circuit shows a switch SW which ideally replaces the transistor T, and an inductance L which is an equivalent inductance for the transformer W in so far as operation of the single-ended down converter is concerned.

FIG. 3 shows a magnetization current $I_m$ and the switch voltage $U_{sw}$ of FIG. 2 as a function of time. Various points of time are indicated by t1-t5. There is shown a steady circuit state, i.e. the switch SW has been opened and closed sufficiently long to have the circuit attain a stable state. There is shown one period t1-t5 including a conductive state and a cut-off state of the transistor T, i.e. the switch closed and opened, respectively. At times t1 and t5 the switch SW is opened. During the interval t1-t2 the current $I_m$ is linearly increasing. In the interval t2-t5 there are shown three different situations for $I_m$. For a barrier layer capacitance (inherently in D1) to infinity (theoretical only) no demagnetization will take place and the current $I_{m1}$ remains constant. For a relatively large barrier layer capacitance the slope of demagnetization $dI_m/dt$ is smaller than for a relatively small barrier layer capacitance. This is shown by means of $I_{m2}$ and $I_{m3}$ respectively. Assuming L to infinity, the switch voltage $U_{SW}$ has a sinusoidal shape. This is shown by waveforms $U_{SW2}$ and $U_{SW3}$ corresponding to $I_{m2}$ and $I_{m3}$ respectively. The switching frequency of the switch Sw is chosen such that $U_{SW2}$ attains its maximum at t5 and $U_{SW3}$ attains its maximum at t3. In the case of $I_{m3}$ and $U_{SW3}$ the switch voltage $U_{SW}$ remains constant at t4 until the switch SW is closed again at t5.

According to the present invention it is essential to adapt the transformer W (FIG. 1) to the barrier layer capacitance in an optimal sense, i.e. to attain a demagnetization operation that is optimum. For a given large switching frequency (e.g. 150kHz) the situation $I_{2m}$, $U_{SW2}$ should not occur, but the situation $I_{m3}$, $U_{SW3}$. The number N2 of secondary windings (FIG. 1) should be chosen large enough to achieve the condition $I_{m3}$, $U_{SW3}$.

FIG. 4 shows a magnetization curve c wherein the magnetic induction B is plotted against the magnetic field H. Prior art circuits such as that described in DE-OS No. 2624 800 operate in the range a-b of the magnetization curve c for a given relatively high switching frequency, whereas the circuit according to the present invention works optimally for the same switching frequency and operates in the range a'-b'. Typically, this leads to reduced core losses in the transformer W by a factor of 4. The optimum can be calculated, or can be determined experimentally. It should be further mentioned that operation in the range a'-b' for a given frequency is better than operation in the range a-b with respect to a correct operation for an increasing switching frequency. Starting from the condition a-b will easily lead to a saturated core for increasing switching frequencies, in which case the magnetization current $I_m$ may increase to an arbitrarily large value, eventually leading to converter shut-down and transistor destruction. Operating the converter according to the invention will allow much higher switching frequencies.

In diodes having a very small barrier layer capacitance, an improvement can be attained in that an additional capacitance is connected parallel to the rectifier diode D1.

If a single-ended down converter should supply a further voltage, or several voltages, it is known to provide instead of only one secondary winding N2 on the secondary side of the transformer a corresponding number of further windings. The demagnetization then takes place through each of the rectifier diodes provided in the output further circuits associated with the further individual windings.

What is claimed is:

1. A single-ended down converter comprising: a pair of input terminals for connection to a source of supply voltage and a pair of output terminals for connection to a load, a transformer having a primary winding and a secondary winding, an input circuit coupled to the input terminals and including a pulse width controlled switching element and said transformer primary winding, an output circuit coupled to the output terminals and including the transformer secondary winding, a rectifier diode and a flywheel diode, said rectifier diode having a conductive state and a cut-off state caused by switching of said switching element and having a barrier layer capacitance present during the cut-off state of the rectifier diode whereby demagnitization of the transformer takes place only by means of said barrier layers capacitance during the cut-off state of the rectifier diode.

2. A single-ended down converter comprising: a pair of input terminals for connection to a source of supply voltage and a pair of output terminals for connection to a load, a transformer having a primary winding and a secondary winding, an input circuit coupled to the input terminals and including a pulse width controlled switching element connected in series circuit with said transformer primary winding across said input terminals, an output circuit coupled to the output terminals and comprising a second series circuit including the transformer secondary winding, a rectifier diode and a flywheel diode, means for applying a switching signal to a control electrode of the switching element whereby the rectifier diode has a conductive state and a cut-off state caused by switching of the switching element, said rectifier diode having a barrier layer capacitance present during the cut-off state of the rectifier diode whereby demagnetization of the transformer takes place only by means of said capacitance during the cut-off state of the rectifier diode.

3. A single-ended down converter as claimed in claim 2 further comprising a capacitor connected in parallel with the rectifier diode.

4. A single-ended down converter as claimed in claim 2 wherein said diodes are connected in series opposition, said converter further comprising an inductor coupling one output terminal to a function point between said diodes and an output capacitor connected across said pair of output terminals.

* * * * *